US009165142B1

(12) United States Patent
Sanders et al.

(10) Patent No.: US 9,165,142 B1
(45) Date of Patent: Oct. 20, 2015

(54) MALWARE FAMILY IDENTIFICATION USING PROFILE SIGNATURES

(71) Applicant: Palo Alto Networks, Inc., Santa Clara, CA (US)

(72) Inventors: Kyle Sanders, Sunnyvale, CA (US); Xinran Wang, San Ramon, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 141 days.

(21) Appl. No.: 13/754,789

(22) Filed: Jan. 30, 2013

(51) Int. Cl.
*G06F 21/56* (2013.01)
*H04L 29/06* (2006.01)

(52) U.S. Cl.
CPC ............ *G06F 21/566* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01)

(58) Field of Classification Search
CPC . H04L 63/14; H04L 63/1416; H04L 63/1425; H04L 63/1433; H04L 63/1441; H04L 63/145; H04L 63/1408
USPC ................................................ 726/23–25, 11
See application file for complete search history.

(56) References Cited

U.S. PATENT DOCUMENTS 5,826,013 A * 10/1998 Nachenberg .................... 726/22
5,987,610 A * 11/1999 Franczek et al. ................ 726/24
6,269,447 B1 * 7/2001 Maloney et al. ................ 726/25
6,775,780 B1 * 8/2004 Muttik ............................ 726/24
6,981,279 B1 * 12/2005 Arnold et al. ................... 726/22
8,156,541 B1 * 4/2012 Thomas et al. .................... 726/3
8,578,497 B2 * 11/2013 Antonakakis et al. .......... 726/24
8,763,127 B2 * 6/2014 Yao et al. ........................ 726/24
8,793,787 B2 * 7/2014 Ismael et al. .................... 726/22
2003/0135791 A1 * 7/2003 Natvig ............................ 714/38
2005/0044422 A1 * 2/2005 Cantrell et al. ............... 713/201
2005/0182950 A1 * 8/2005 Son et al. ...................... 713/189
2005/0216770 A1 * 9/2005 Rowett et al. ................. 713/201
2006/0227758 A1 * 10/2006 Rana et al. .................... 370/351
2007/0016953 A1 * 1/2007 Morris et al. ................... 726/24
2007/0056038 A1 * 3/2007 Lok ................................ 726/23
2007/0118350 A1 * 5/2007 van der Made ................. 703/22
2007/0121615 A1 * 5/2007 Weill et al. .................... 370/389
2007/0192866 A1 * 8/2007 Sagoo et al. .................... 726/24
2007/0289010 A1 * 12/2007 Thomas et al. ................. 726/13

(Continued)

OTHER PUBLICATIONS

Cesare et al., "Malwise—An Effective and Efficient Classification System for Packed and Polymorphic Malware", IEEE Transactions on Computers, 2012.

(Continued)

*Primary Examiner* — Kambiz Zand
*Assistant Examiner* — Tongoc Tran
(74) *Attorney, Agent, or Firm* — Van Pelt, Yi & James LLP

(57) ABSTRACT

Techniques for malware family identification using profile signatures are disclosed. In some embodiments, malware identification using profile signatures includes executing a potential malware sample in a virtual machine environment (e.g., a sandbox); and determining whether the potential malware sample is associated with a known malware family based on a profile signature. In some embodiments, the virtual machine environment is an instrumented virtual machine environment for monitoring potential malware samples during execution.

19 Claims, 8 Drawing Sheets

(56) References Cited

U.S. PATENT DOCUMENTS

| | | | | |
|---|---|---|---|---|
| 2008/0005782 | A1* | 1/2008 | Aziz | 726/3 |
| 2008/0016570 | A1* | 1/2008 | Capalik | 726/23 |
| 2008/0196104 | A1* | 8/2008 | Tuvell et al. | 726/24 |
| 2008/0209557 | A1* | 8/2008 | Herley et al. | 726/23 |
| 2008/0307493 | A1* | 12/2008 | Moghe et al. | 726/1 |
| 2009/0013405 | A1* | 1/2009 | Schipka | 726/22 |
| 2009/0064337 | A1* | 3/2009 | Chien | 726/25 |
| 2009/0094697 | A1* | 4/2009 | Provos et al. | 726/23 |
| 2009/0126016 | A1* | 5/2009 | Sobko et al. | 726/23 |
| 2009/0144827 | A1* | 6/2009 | Peinado et al. | 726/25 |
| 2009/0238071 | A1* | 9/2009 | Ray et al. | 370/235 |
| 2009/0282483 | A1* | 11/2009 | Bennett | 726/23 |
| 2010/0077476 | A1* | 3/2010 | Adams | 726/22 |
| 2010/0077481 | A1* | 3/2010 | Polyakov et al. | 726/24 |
| 2010/0115621 | A1* | 5/2010 | Staniford et al. | 726/25 |
| 2010/0146615 | A1* | 6/2010 | Locasto et al. | 726/11 |
| 2010/0212010 | A1* | 8/2010 | Stringer et al. | 726/22 |
| 2010/0217801 | A1* | 8/2010 | Leighton et al. | 709/203 |
| 2011/0041179 | A1* | 2/2011 | St Hlberg | 726/23 |
| 2011/0078794 | A1* | 3/2011 | Manni et al. | 726/23 |
| 2011/0099633 | A1* | 4/2011 | Aziz | 726/24 |
| 2011/0219448 | A1* | 9/2011 | Sreedharan et al. | 726/23 |
| 2011/0252474 | A1* | 10/2011 | Ward et al. | 726/23 |
| 2011/0276699 | A1* | 11/2011 | Pedersen | 709/227 |
| 2011/0321160 | A1* | 12/2011 | Mohandas et al. | 726/22 |
| 2012/0054866 | A1* | 3/2012 | Evans et al. | 726/23 |
| 2012/0222121 | A1* | 8/2012 | Staniford et al. | 726/24 |
| 2012/0304244 | A1* | 11/2012 | Xie et al. | 726/1 |
| 2013/0086684 | A1* | 4/2013 | Mohler | 726/24 |

OTHER PUBLICATIONS

Hosmer et al., “Polymorphic & Metamorphic Malware”, Black Hat Briefings and Training, 2008, WetStone Technologies.

Author Unknown, “IOC Finder”, Mandiant—Detect. Respond. Contain., Oct. 31, 2011.

* cited by examiner

MALWARE FAMILY IDENTIFICATION USING PROFILE SIGNATURES

BACKGROUND OF THE INVENTION

Malware is a general term commonly used to refer to malicious software (e.g., including a variety of hostile, intrusive, and/or otherwise unwanted software). For example, malware is software used or created by attackers or hackers to disrupt computer and/or computer network operation, steal proprietary information (e.g., confidential information, such as identity, financial, and/or intellectual property related information), and/or gain access to private/proprietary computer systems and/or computer networks. Malware can be in the form of code, scripts, active content, and/or other software.

Malware includes computer viruses, worms, Trojan horses, rootkits, key loggers, spyware, adware, and/or other malicious programs. Malware typically does not refer to simply defective software, which is software that has a legitimate purpose but can include harmful bugs and/or vulnerabilities that were not corrected before release of the software. However, some malware is disguised as genuine software and can come from an official company website. For example, otherwise legitimate software can be improperly packed with additional tracking software that gathers user information without user permission.

BRIEF DESCRIPTION OF THE DRAWINGS

Various embodiments of the invention are disclosed in the following detailed description and the accompanying drawings.

DETAILED DESCRIPTION

Figure 1:
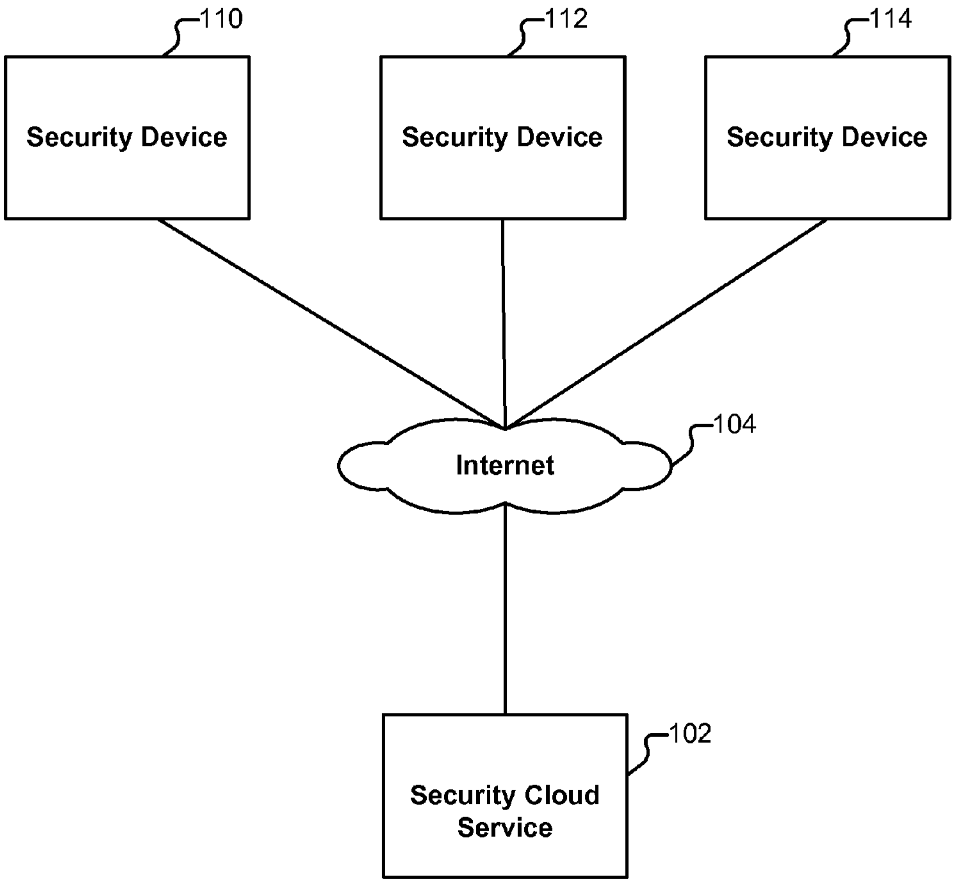
FIG. 1 is a functional block diagram illustrating malware identification using profile signatures in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malware is a general term commonly used to refer to malicious software (e.g., including a variety of hostile, intrusive, and/or otherwise unwanted software). For example, malware is software used or created by attackers or hackers to disrupt computer and/or computer network operation, steal proprietary information (e.g., confidential information, such as identity, financial, and/or intellectual property related information), and/or gain access to private/proprietary computer systems and/or computer networks. Malware can be in the form of code, scripts, active content, and/or other software.

Malware includes computer viruses, worms, Trojan horses, rootkits, key loggers, spyware, adware, and/or other malicious programs. Malware typically does not refer to simply defective software, which is software that has a legitimate purpose but can include harmful bugs and/or vulnerabilities that were not corrected before release of the software. However, some malware is disguised as genuine software and can come from an official company website. For example, otherwise legitimate software can be improperly packed with additional tracking software that gathers user information without user permission.

Various types of antimalware products are commercially available that attempt to block or prevent infection of computers and/or computer networks of various types of malware. Example antimalware products include antivirus (AV) software products (e.g., host based AV software) and firewalls, such as security appliances that include firewalls (e.g., next-generation firewall solutions from Palo Alto Networks, Inc.). Such commercially available products are commonly used by personal users and/or corporate users (e.g., on their computing devices) as well as corporate networks to attempt to protect such users and/or networks from unauthorized access by other computer users and/or infection and spreading of malware on such computing devices and/or computer networks.

A variety of strategies are typically utilized by antimalware products. Signature-based detection is an antimalware technique that generally involves searching for known patterns of data within executable code (e.g., performing a static analysis of the executable file(s) to determine whether the signature can be matched based on the static analysis of the executable file(s)). Such signatures can be generated for specific malware that has been previously identified and analyzed (e.g., by a security analyst, who can determine unique features files that can be statically detected that can subsequently be used for signature-based detection of that particular malware).

It is also possible for a computer to be infected with new malware for which no signature is yet known or disseminated. To counter such so-called zero-day threats, various non-signature based techniques, such as various types of heuristic based techniques, can be used as an attempt to identify potential malware. One type of heuristic approach includes using generic signatures that can identify new viruses or variants of existing viruses by looking for known malicious code in files.

Another type of antimalware technique is sometimes referred to behavior analysis or dynamic analysis techniques. For example, dynamic analysis techniques attempt to predict what an executable file will do by running it in a sandbox (e.g., a virtual environment (VM)) and analyzing what it does within that sandbox to determine if it performs any malicious or potentially malicious actions.

However, such non-signature based approaches can fail to identify malware and/or can improperly identify legitimate software as malware (e.g., also referred to as false positives). Also, such non-signature based approaches can fail to determine if the potentially malicious software is a variant of a known malware family. For example, merely determining that a file is malware or potentially malicious using such non-signature based approaches does not identify whether that malware is a member of a particular malware family (e.g., a variant of a known malware family that is a member of such malware family).

Modern malware also often use several different types of techniques to avoid detection and hide their core functionality. For example, malware can use polymorphic packers (e.g., a polymorphic packer is a software tool that can roll up several kinds of malware into a single package, such as an e-mail attachment, and also can provide the ability to make its signature mutate over time, so it is more difficult to detect and remove using typical antimalware solutions) and/or other polymorphic or mutation related techniques (e.g., custom packers). Also, the number of different malware samples is continually increasing. Thus, providing techniques for identifying malware and, more specifically, identifying that such malware is part of a particular malware family presents significant challenges.

As discussed above, some antimalware approaches focus on artifacts of the actual payload of a malware sample to attempt to group malware samples together (e.g., identifying strings in the binary or structure of malicious code). However, polymorphic and custom packers hinder this effort as also discussed above. Non-signature based anti-malware techniques can sometimes detect such malware, but fail to identify whether such malware is a member of a known malware family as also discussed above.

What are needed are techniques for identifying malware and, more specifically, identifying that such malware is part of a particular malware family. In particular, identifying that such malware is part of a particular malware family provides additional information to an information technology (IT), network, and/or security admin(istrator) and a security vendor (e.g., knowing a modus operandi of attackers can assist in defensive responses to an attack). For example, certain malware families can present more significant risks or threats to users and/or enterprises, such as Zeus (e.g., also known as Zbot, is a malware toolkit that allows a cybercriminal to build their own Trojan Horse, and, in particular, Zeus is a Trojan horse that can be used to steal banking information by man-in-the-browser keystroke logging and form grabbing, and was first identified in July 2007 when it was used to steal information from the United States Department of Transportation, and it became more widespread in March 2009). Thus, a security solution that can inform IT of an enterprise that one or more of their devices was infected with malware and/or attempted to download malware (e.g., Zeus is commonly delivered using drive-by-download techniques) that is a member of the Zeus malware family can provide IT with valuable information on how to respond based on the known threats and/or risks associated with the Zeus malware family (e.g., or other malware families that can pose similar or different risks or threats).

Accordingly, techniques for malware family identification using profile signatures are disclosed. For example, using various techniques for malware family identification using profile signatures as disclosed herein can facilitate detection and remediation of malware by identifying that such malware is part of a particular malware family (e.g., to assist in accurately naming malicious samples at time of discovery).

In some embodiments, malware family identification using profile signatures includes executing a potential malware sample in a virtual machine (VM) environment (e.g., a sandbox); and determining whether the potential malware sample is associated with a known malware family based on a profile signature. In some embodiments, the VM environment is an instrumented VM environment for monitoring potential malware samples during execution.

In some embodiments, malware family identification using profile signatures further includes performing a dynamic analysis of the potential malware sample to determine whether the potential malware sample is associated with a known malware family. In some embodiments, malware family identification using profile signatures further includes performing a dynamic analysis of the potential malware sample to classify the potential malware sample based on a modus operandi of the potential malware sample (e.g., instead of merely using features contained within the potential malware sample itself). For example, using these techniques it is extremely difficult for malware authors to hide their modus operandi to avoid detection.

In some embodiments, malware family identification using profile signatures further includes receiving the potential malware sample from a security device (e.g., a host-based or gateway/appliance/server based firewall or security appliance providing inline firewall functionality) for performing a dynamic analysis of the potential malware sample using an instrumented VM to determine whether the potential malware sample is associated with a known malware family based on profile signatures. For example, a security cloud service can receive one or more potential malware samples from one or more firewalls and/or security appliances from various customers of the security cloud service), and the security cloud service can perform the dynamic analysis of the potential malware samples using an instrumented VM(s) to determine whether the potential malware sample is associated with a known malware family based on profile signatures as further described herein. Also, a source identifier (e.g., a source uniform resource identifier (URI) or uniform resource locator (URL)) for the potential malware sample can be used by the security cloud service (e.g., the host-based or gateway/appliance/server based firewall or security appliance providing the potential malware sample can provide such URI/URL information based on where that particular potential malware sample was downloaded from on the Internet or world-wide web). The security cloud service can provide feedback to the firewalls, security appliances, and/or IT admins of such customers of the security cloud service and/or to security vendors to inform them of any detected known malware family results (e.g., feedback can be provided programmatically using application programming interfaces (APIs) or other mechanism, alerts, and/or notifications can be provided using e-mail, text messaging, voice communications, and/or other notification techniques), so that appropriate responses can be implemented by such security vendor(s) and/or security devices and/or such customers (e.g., if malware associated with the Zeus family is detected, then a customer may implement a more aggressive IT/security response).

In some embodiments, malware family identification using profile signatures further includes performing a dynamic analysis of the potential malware sample to classify the potential malware sample as associated with a malware family.

In some embodiments, malware family identification using profile signatures further includes performing a dynamic analysis of the potential malware sample to classify the potential malware sample as associated with a malware family, including monitoring application programming interface (API) activities performed by the potential malware sample during execution time in the virtual machine environment (e.g., generating an API log that can be used to assist in automatically classifying the potential malware sample as associated with a known malware family).

In some embodiments, malware family identification using profile signatures further includes performing a static analysis (e.g., analyzing files of the potential malware sample not during execution time) and performing a dynamic analysis of the potential malware sample to classify the potential malware sample as associated with a malware family.

In some embodiments, malware family identification using profile signatures further includes performing a dynamic analysis of the potential malware sample to classify the potential malware sample as associated with a malware family, including monitoring network activities performed by the potential malware sample during execution time in the VM environment.

In some embodiments, the profile signature includes an intrusion prevention system (IPS) signature, and the malware family identification using profile signatures further includes performing a dynamic analysis of the potential malware sample to classify the potential malware sample as associated with a malware family, including monitoring network activities performed by the potential malware sample during execution time in the VM (e.g., instrumented VM environment).

FIG. 1 is a functional block diagram illustrating malware family identification using profile signatures in accordance with some embodiments. As shown, a security cloud service 102 is in network communication via the Internet 104 with various security devices 110, 112, and 114 (e.g., host-based or gateway/appliance/server based firewalls and/or security appliances that include firewall functionality, which can be located on the premises of one or more customers of the security cloud service). In some embodiments, the security cloud service 102 receives potential malware samples from various security devices 110, 112, and/or 114 via the Internet 104 and performs a dynamic analysis using an instrumented virtual machine to determine whether any of the potential malware samples are associated with a known malware family based on profile signatures using various techniques described herein.

For example, the security cloud service can provide for integration of such inline firewalls with the cloud by making use of a customer's on-premises firewalls in conjunction with a cloud-based security analysis engine that can deliver both protection and performance. The inline firewall on one or more customer premises can capture unknown files and can perform inline enforcement (e.g., using signature detection and/or other techniques locally on the security device) while maintaining high network throughput and low latency. The analysis of unknown files, sometimes referred to herein as potential malware samples, can then be offloaded to the security cloud service that provides a secure cloud-based engine to identify unknown malware and subsequently deliver protections to all locations of the security cloud service. The customer's on-premises firewalls can be configured to securely communicate with the security cloud service (e.g., using secure communication protocols, such as SSL, VPNs, and/or using other secure communication techniques). An example security cloud service includes the Wildfire® security cloud service provided by Palo Alto Networks.

Further, the security cloud service can provide a virtualized sandbox (e.g., virtual machine engine) for performing dynamic analysis on the potential malware samples using various techniques described herein. For example, when an inline firewall encounters an unknown file, the file can be submitted to the security cloud service (e.g., source identifier information, such as URI/URL, can also be submitted with the file as described herein). Such submissions of the potential malware samples can be provided manually or automatically based on a security policy configured for each security device and/or customer. In particular, the security cloud service can perform the dynamic analysis of the file (e.g., an executable file in this example) using an instrumented virtual machine(s) to determine whether the file (e.g., potential malware sample) is associated with a known malware family based on profile signatures as further described herein.

Figure 2:
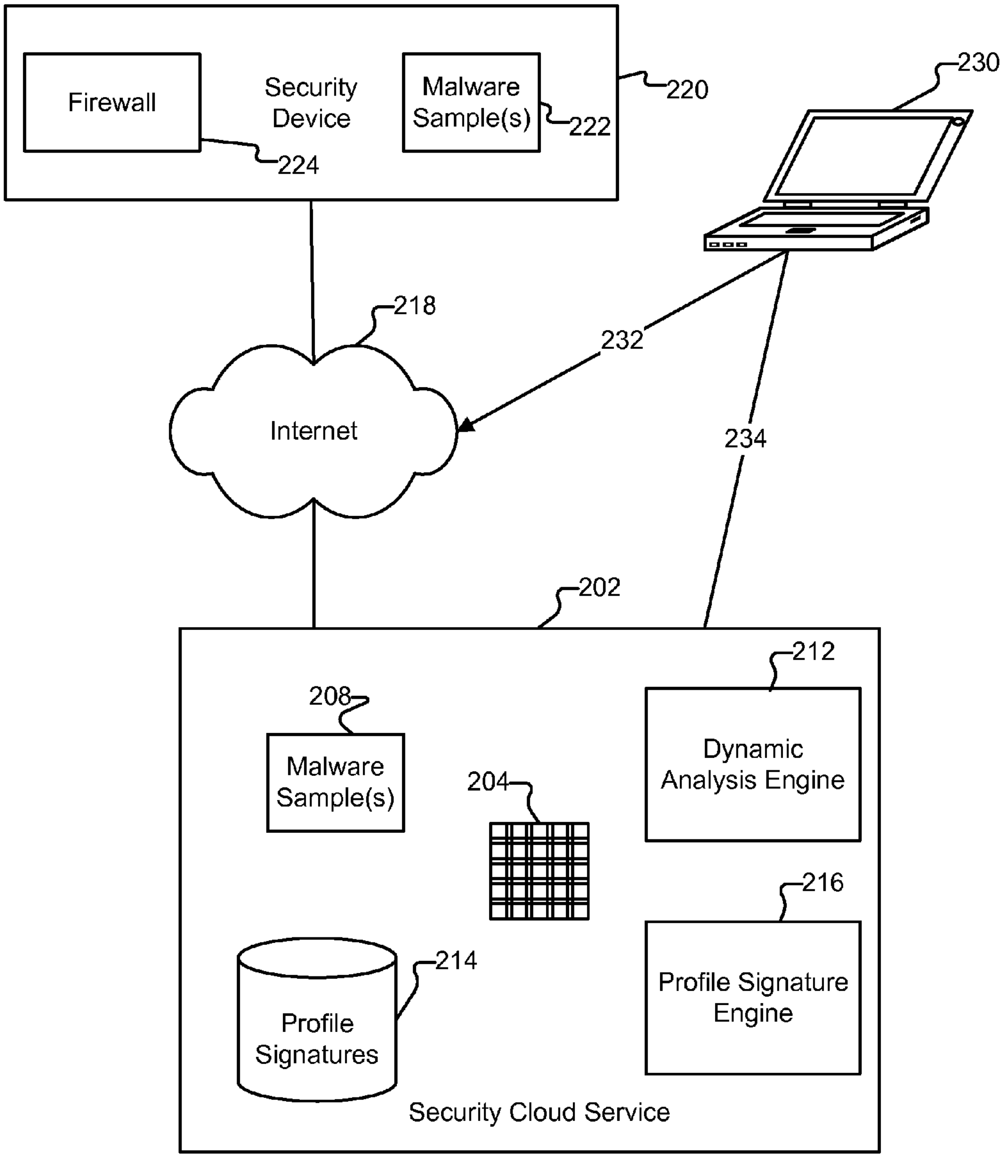
FIG. 2 is another functional block diagram illustrating malware family identification using profile signatures in accordance with some embodiments.

FIG. 2 is another functional block diagram illustrating malware family identification using profile signatures in accordance with some embodiments. As shown, a security cloud service 202 is in communication with one or more security devices, including security device 220, via the Internet 218. The security device 220 includes a firewall 224 (e.g., an inline firewall) and potential malware samples 222. For example, the potential malware samples 222 can include potential malware samples that the security device 220 could not determine whether such are malware and/or the malware family associated with such samples. As similarly discussed above, such potential malware samples 222 can be sent to the security cloud service 202 for further analysis. As also shown, the security cloud service includes a processor(s) 204, potential malware samples 208 received from various security devices including security device 220, a dynamic analysis engine 212, profile signatures 214, and a profile signature engine 216. As further described herein with respect to various embodiments, the security cloud service 202 can execute a potential malware sample 208 to perform a dynamic analysis of the potential malware sample using the dynamic analysis engine 212 (e.g., an instrumented virtual machine/sandbox environment) to determine whether the potential malware sample is associated with a known malware family using the profile signature engine 216 based on profile signatures 214. In some embodiments, the profile signature engine is used to compare profile signatures with data collected by the dynamic analysis engine to match the runtime context information. For example, using a dynamic analysis environment provides an ability to triage large malware sample sets.

As also shown, an IT/security admin can use a computing device 230 (e.g., desktop computer, workstation, laptop, tablet, smart phone, and/or other computing device) to communicate with the security cloud service 202 via a communication 232 through the Internet 218 or through a local communication 234. For example, an IT/security admin can use a computing device 230 to send a potential malware sample for further analysis to the security cloud service 202. As another example, an IT/security admin can use computing device 230 to send a profile signature to the security cloud service 202.

Figure 3:
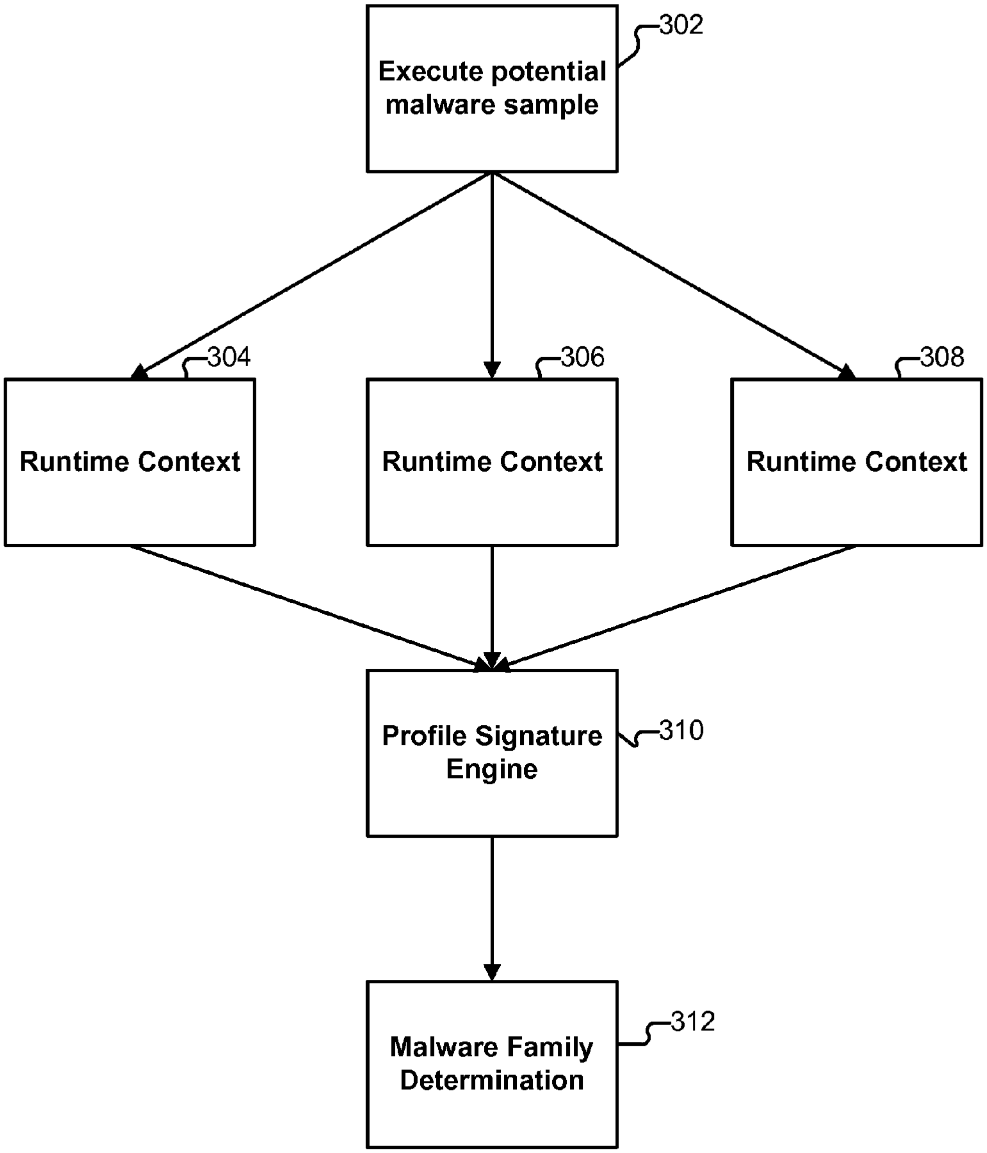
FIG. 3 is a logic flow diagram illustrating malware family identification using profile signatures in accordance with some embodiments.

FIG. 3 is a logic flow diagram illustrating malware family identification using profile signatures in accordance with some embodiments. As shown at 302, a potential malware sample is executed to perform a dynamic analysis of the potential malware sample using various dynamic analysis techniques (e.g., using an instrumented virtual machine/sandbox environment) to determine whether the potential malware sample is associated with a known malware family based on one or more profile signatures. Various runtime contexts 304, 306, and 308 are monitored during execution of the potential malware sample. The runtime contexts 304, 306, and 308 are input to a profile signature engine 310 that can use the runtime context information to facilitate determination of whether the potential malware sample matches a profile signature. At 312, a malware family determination of the potential malware sample is provided if there is a profile signature match, and no malware family is identified if there is no profile signature match.

Figure 4:
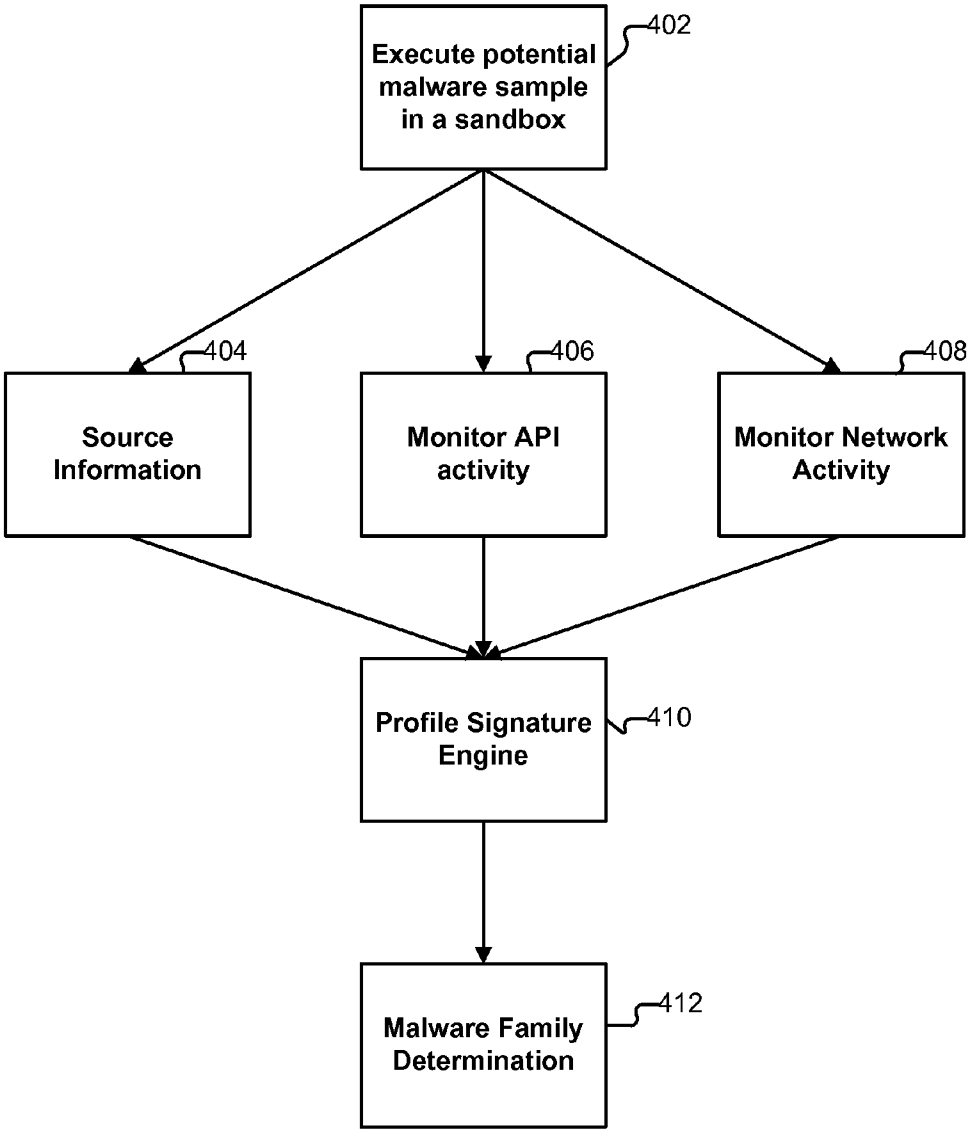
FIG. 4 is another logical flow diagram illustrating malware family identification using profile signatures in accordance with some embodiments.

FIG. 4 is another logical flow diagram illustrating malware family identification using profile signatures in accordance with some embodiments. As shown at 402, a potential malware sample is executed in a sandbox to perform a dynamic analysis of the potential malware sample using various dynamic analysis techniques (e.g., using an instrumented virtual machine/sandbox environment) to determine whether the potential malware sample is associated with a known malware family based on one or more profile signatures. Various runtime contexts 404, 406, and 408 are used as input to the profile signature engine 410. In particular, as shown, source information 404 (e.g., URI/URL information that identifies a source of the potential malware sample, as provided by the inline firewall that submitted the potential malware sample) is provided as an input to the profile signature engine. As also shown at 406, API activity is monitored during execution of the potential malware sample to generate an API log to provide as input to the profile signature engine. For example, if the potential malware sample is a file that executes in a Microsoft Windows® operating system environment, then the sandbox emulates a Microsoft Windows® operating system environment using an instrumented virtual machine that can intercept and log various Windows API calls. Similarly, various other operating system environments can be emulated to generate similar API log information as a runtime context input to the profile signature engine. As also shown at 408, network activity is monitored during execution of the potential malware sample. For example, network activity (e.g., requests for communications inbound and/or outbound) can be monitored using various packet capture techniques capturing network traffic using an application programming interface (API), such as using libpcap and/or Winpcap, to capture packets (e.g., pcap information) travelling over a network (e.g., in this case, in the virtual machine emulated environment). In some embodiments, various other types of runtime contexts can also be monitored (e.g., packer name information and/or other runtime contexts, such as memory usage during runtime, etc.) and provided as additional runtime context input to the profile signature engine. In some embodiments, static analysis techniques can be performed on the file(s) of the potential malware sample and provided as additional input to the profile signature engine. These runtime contexts 404, 406, and 408 are input to the profile signature engine 410 that can use the runtime context information to facilitate determination of whether the potential malware sample matches a profile signature. In some embodiments, the profile signature can include IPS signature based information (e.g., pcap information can be used to facilitate a profile signature match using an IPS engine) as described herein with respect to various embodiments. At 412, a malware family determination of the potential malware sample is provided if there is a profile signature match, and no malware family is identified if there is no profile signature match.

Figure 5:
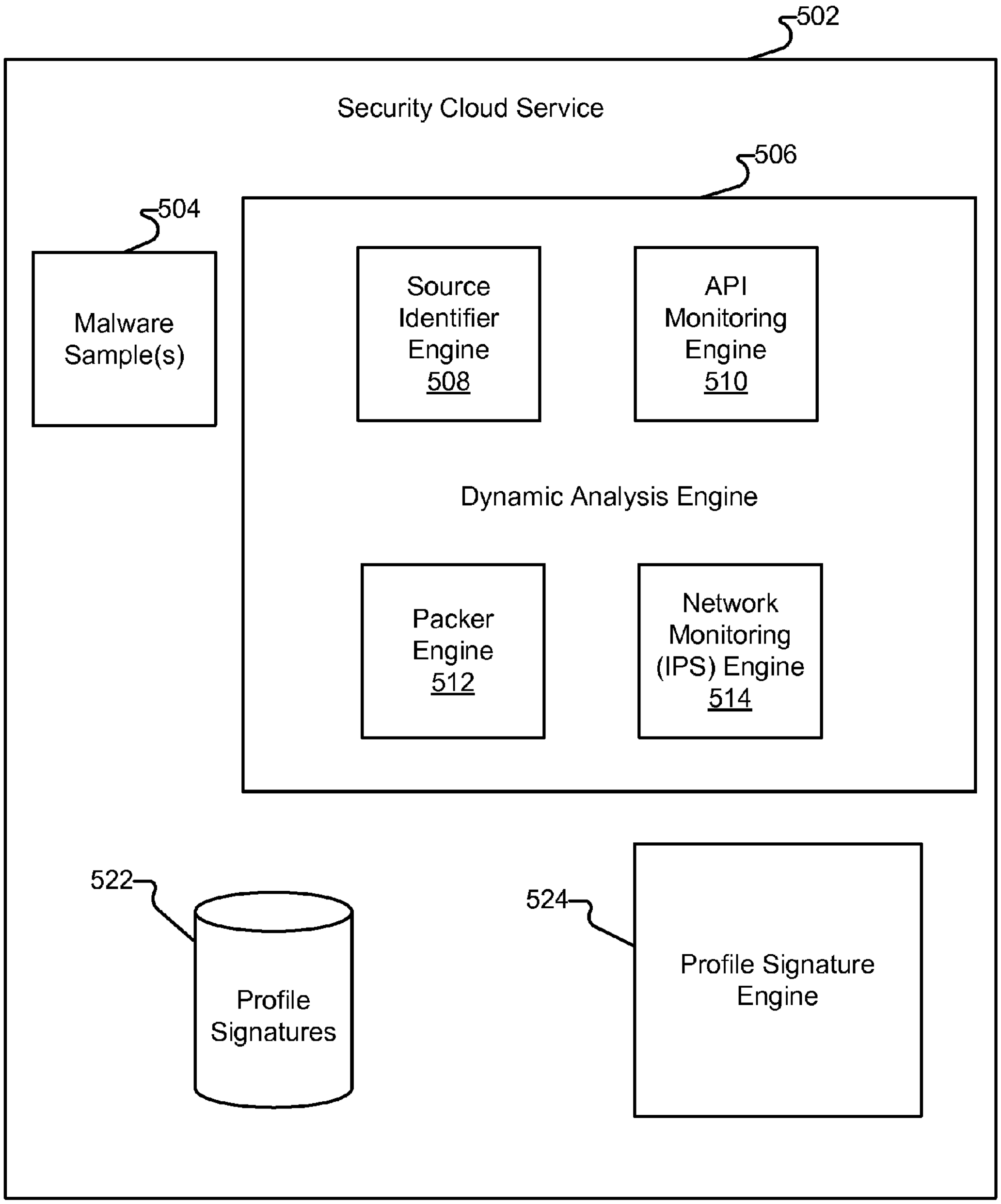
FIG. 5 is a functional block diagram illustrating a security cloud service for providing malware family identification using profile signatures in accordance with some embodiments.

FIG. 5 is a functional block diagram illustrating a security cloud service for providing malware family identification using profile signatures in accordance with some embodiments. As shown, a security cloud service 502 is provided, which as similarly discussed above can be in communication with one or more security devices via the Internet for receiving potential malware sample(s) 504. As similarly discussed above, such potential malware sample(s) 504 can be sent to the security cloud service 502 for further analysis. As also shown, the security cloud service includes a dynamic analysis engine 506, profile signatures 522, and a profile signature engine 524. As further described herein with respect to various embodiments, the security cloud service 502 can execute a potential malware sample 504 to perform a dynamic analysis of the potential malware sample using the dynamic analysis engine 506 (e.g., an instrumented virtual machine/sandbox environment) to determine whether the potential malware sample is associated with a known malware family using the profile signature engine 524 based on profile signatures 522. As also shown, the dynamic analysis engine 506 includes a source identifier engine 508 (e.g., for identifying URI/URL source information of the potential malware sample, which can be obtained by querying the security device that submitted the potential malware sample or extracted from the submission from the security device that submitted the potential malware sample), an API monitoring engine 510 (e.g., for monitoring and logging API calls during runtime of the potential malware sample), a packer engine 512 (e.g., for monitoring and logging packer name and/or other packer related information during runtime of the potential malware sample), and a network monitoring engine 514 (e.g., for monitoring and logging network activity during runtime of the potential malware sample) that provide various runtime context information, such as described herein with respect to various embodiments, as input to the profile signature engine to facilitate determining whether the potential malware sample is associated with a known malware family based on profile signatures 522. In some embodiments, the dynamic analysis engine 506 includes the network monitoring engine 514, and in some embodiments, these are implemented as separate engines that can then both provide runtime context input to a profile signature engine or IPS profile signatures can be matched using a separate IPS profile signature engine (not shown).

For example, the security cloud service can include a sandbox environment (e.g., instrumented virtual machine environment) that executes a potential malware sample in the sandbox environment to build a series of run-time contexts (e.g., source identifier (URI/URL), API log, packer information, network activity, etc.). In particular, the sandbox environment can be an instrumented environment that executes a dynamic analysis engine such as shown in FIG. 5 that includes an API monitoring engine that logs monitored APIs for a potential malware sample during runtime, a packer monitoring engine that determines packer related information for the potential malware sample during runtime, a network monitoring engine that can monitor network activities of the potential malware sample during runtime, and/or various other runtime context monitoring information can be monitored and logged using the dynamic analysis engine. A source URL can include a location where a sample was downloaded from (e.g., www.malware-source-website.com, which can be provided by a security device that provided the sample to the security cloud service). An API log can provide a recording of various high-level API calls that the potential malware sample performs while executing in the sandbox (e.g., Windows API calls observed and logged by monitoring API calls to Microsoft Windows® operating system in the emulated Windows VM environment). Packer information can include determining a packer based on static analysis and/or using dynamic analysis to identify one or more packers associated with a sample that is monitored during runtime in the sandbox. In some embodiments, network traffic activity is also monitored during runtime using a network monitoring engine (e.g., a traffic monitoring agent in the instrumented VM environment that can record monitored network traffic in, for example, a pcap format or some other format and analyze that captured packet traffic data using an IPS engine to identify malware including network threats or other malicious activities as further described herein).

For example, using various techniques described herein for monitoring a potential malware sample during runtime in a sandbox environment, the potential malware sample's behavior (e.g., runtime context information, including, for example, files created—names of files/location of such files etc., registry key changes, processes launched, packer names and packer related information, network activity, memory usage, etc.) can be monitored and logged, and then compared with profile signatures as a finger print (e.g., set of rules for matching or identifying that potential malware sample based on previously identified characteristics or patterns associated with a given malware family) to not only identify that such is malware but can associate such malware as being in a particular, known malware family. As discussed above, determining that a particular malware sample is a member of a known malware family provides valuable information to security vendors and customers.

In some embodiments, the security cloud service 502 can perform other security analysis techniques on the potential malware samples. For example, such other security analysis techniques can include scanning memory in the sandbox (e.g., instrumented VM) to identify unique memory usage features using a memory monitoring engine (not shown), and/or other features that can be monitored during runtime of the potential malware sample in the sandbox. In addition, such other security analysis techniques can include static analysis techniques and can be performed on the potential malware samples using a static analysis engine (not shown) (e.g., binary code analysis of a sample, and in some cases, further including decompilation for source code based analysis) and used as another input to the profile signature engine 524 for facilitating a determination of a malware family of the potential malware sample.

An example profile signature is provided below. In some embodiments, signature profiles are compiled and executed using the profile signature engine to match potential malware sample(s). As shown in the below example profile signature, if matches (e.g., and operations) of API log and packer information, then the security cloud service can identify the sample as associated with that known malware family. In some embodiments, profile signatures are implemented in an extensible markup language (XML) format to provide a simple mechanism to update signatures using the security cloud service. In particular, in this example, this profile signature is matched if there is both an API log match and packer name match, and specifically, a pattern match in an API log runtime context (e.g., RegSetValueEx, .*\\Policies\\Explorer\\Run, .*, [a-fA-F0-9]*\.exe$ as well as a packer name pattern match (e.g., ASPack.*). As discussed above, in addition to dynamic features, various static features can also be used to facilitate identification of the malware family of samples.

Example Signature Profile:

```
<Profile>
    <and>
        <match>
                <context>wf-api-log</context>
                <pattern>
            (RegSetValueEx,
            . *\\Policies\\Explorer\\Run,
            .*,
            [a-fA-F0-9]*\.exe$ )
                </pattern>
        </match>
            <match>
                <context>wf-pe-packer-name</context>
                <pattern>
                 ( ASPack.*)
                </pattern>
              </match>
    </and>
</Profile>
```

A portion of another example profile signature that includes an IPS signature is provided. In this example, this IPS signature portion of the profile signature is matched if there is a pattern match of >\nUser-Agent: Opera/9\(Windows NT 5.1; [A\Z]*; x86\)\r\n in the context of http-req-headers.

Example IPS Signature Profile Excerpt:

```
<Profile >
...
    <entry>
        <pattern-match>
            <ignore-case>no</ignore case>
                <pattern>\nUser-Agent: Opera/9\(Windows NT 5.1;
[A\Z]*;x86\)\r\n</pattern>
                 <context>http-req-headers</context>
                <pattern-match>
    </entry>
  </and>
...
</Profile>
```

For example, profile signatures can provide heuristic based analysis (e.g., developed by a security analyst to determine features to uniquely identify features of malware and differentiate that malware as being part of a particular malware family, such as based on patterns of file names created in a user's directory that always end in a particular pattern/file naming conventions, such as bad.exe, but can be aaa.bad.exe or bbb.bad.exe, etc., which can be determined based on code analysis to determine consistent/constant behaviors of malware samples known to be part of a particular malware family). For example, profile signatures can be generated for malware families based on observation of unique actions/behaviors determined to be associated with samples discovered in the wild that have been determined to be associated with a particular family. Thus, profile signatures provides for additional information for security vendors, IT/security admins, and/or other computer users by not only identifying malware but identifying that such detected malware is associated with a particular family, which can then be used by security vendors, IT/security admins, and/or other computer users to perform appropriate, specific responsive actions based on the identified malware family for a given malware sample.

As will be apparent to one of ordinary skill in the art in view of the various embodiments disclosed herein, various other profile signatures can be provided using similar or other formats based on runtime contexts that can be monitored in a sandbox environment, such as described herein with respect to various embodiments. In some embodiments, profile signatures include various API runtime context information, network activity runtime context information, source identifier information, packer related context information, static information, and/or various other information, such as described herein with respect to various embodiments.

Figure 6:
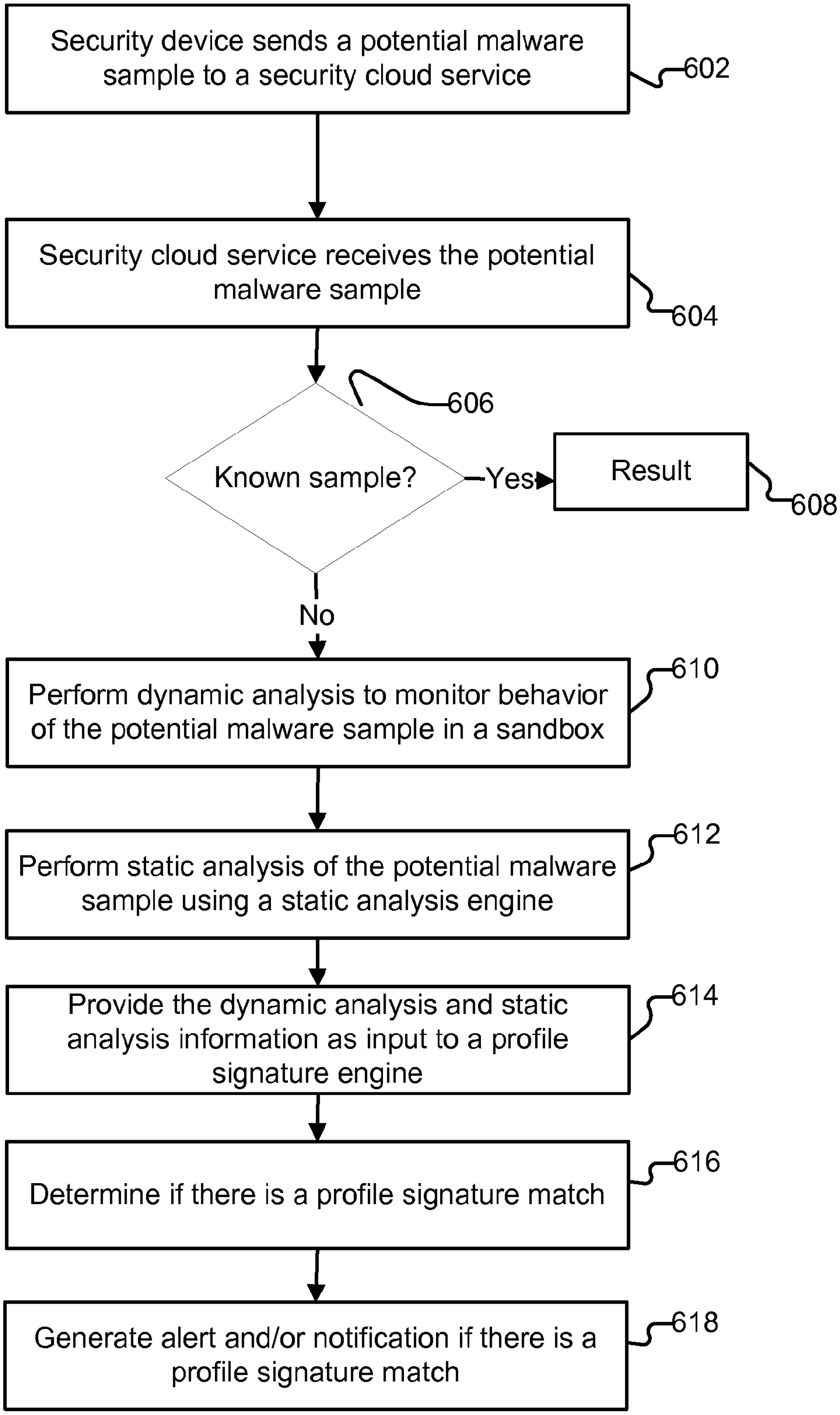
FIG. 6 is a flow diagram illustrating malware identification using profile signatures in accordance with some embodiments.

FIG. 6 is a flow diagram illustrating malware identification using profile signatures in accordance with some embodiments. At 602, a security device sends a potential malware sample to a security cloud service. At 604, the security cloud service receives the potential malware sample. Whether the potential malware sample is a known sample (e.g., has been previously analyzed and results of that prior analysis have been cached or stored by the security cloud service) is determined at 606. For example, files can be matched by various comparison techniques (e.g., using hashes, such as an MD5 based hash or other hashing or file comparison techniques). If the potential malware sample was already/previously analyzed by the security cloud service, then the previously determined result is provided at 608. Otherwise, processing proceeds to 610 to perform a dynamic analysis to monitor behavior (e.g., runtime context(s)) of the potential malware sample in a sandbox (e.g., instrumented VM environment using a dynamic analysis engine). At 612, a static analysis of the potential malware sample is performed using a static analysis engine. At 614, the collected and logged dynamic analysis information and static analysis information are provided as input to a profile signature engine. At 616, the profile signature engine determines whether there is a match with a profile signature. At 618, an alert and/or notification (e.g., to a security vendor, IT/security admin, user, and/or other person or entity associated with the submitted potential malware sample) is generated if a profile signature match was determined. In some embodiments, the results for the potential malware sample are cached or stored by the security cloud service (e.g., to avoid having to repeat the analysis of a later submission of an identical malware sample from another security device and to maintain a collection of malware samples identified as associated with/members of particular malware families).

Figure 7:
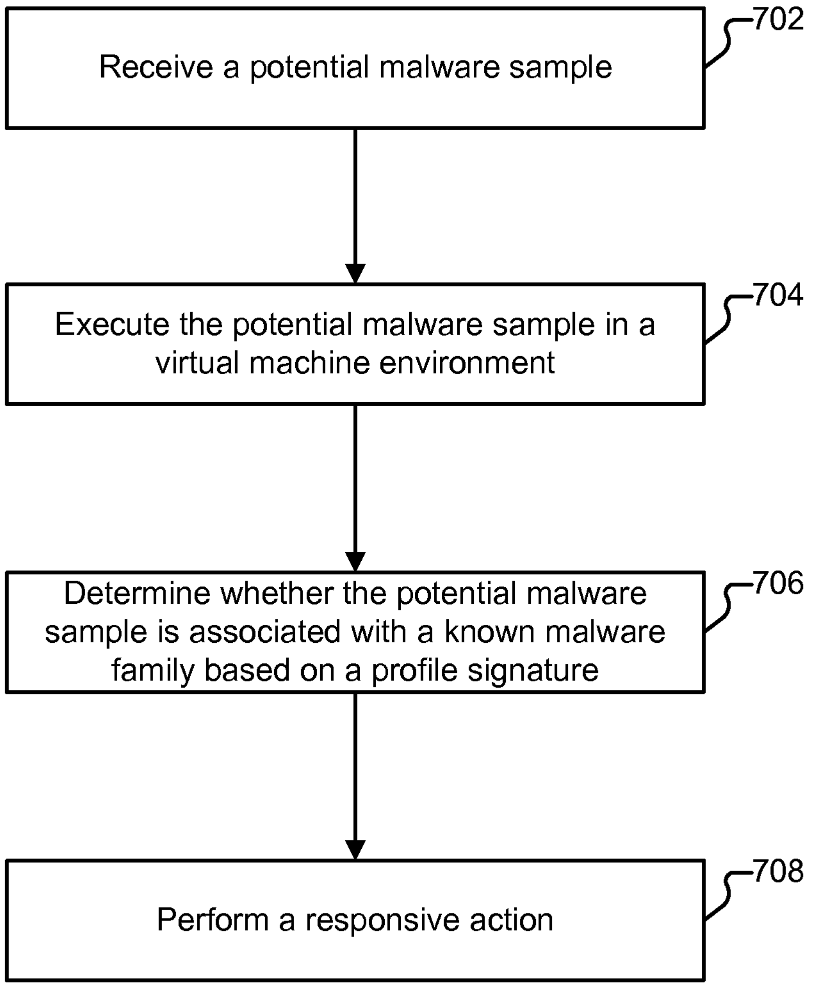
FIG. 7 is another flow diagram illustrating malware identification using profile signatures in accordance with some embodiments.

FIG. 7 is another flow diagram illustrating malware identification using profile signatures in accordance with some embodiments. At 702, a potential malware sample is received. At 704, executing the potential malware sample in a virtual machine environment (e.g., a sandbox) is performed. In some embodiments, the virtual machine environment is an instrumented virtual machine environment for monitoring potential malware samples during execution. At 706, whether the potential malware sample is associated with a known malware family based on a profile signature is determined. At 708, a responsive action is performed (e.g., an alert and/or notification to a security vendor, IT/security admin, user, and/or other person or entity associated with the submitted potential malware sample can be generated if a profile signature match was determined).

While Intrusion Detection System (IDS) and Intrusion Prevention System (IPS) are existing security technologies, such IDS/IPS security technologies have generally not been utilized in sandbox environments. Accordingly, techniques are disclosed for implementing IDS/IPS engines in a sandbox, such as an instrumented VM environment, such as similarly described above, to facilitate malware detection and/or malware family identification, as similarly described herein with respect to various embodiments. In some embodiments, a sandbox environment captures and logs monitored network traffic activity from the potential malware sample during execution in the sandbox, such as similarly described herein. By capturing such network traffic activity of a potential malware sample during runtime in a sandbox, whether the potential malware sample is malicious can be determined using IPS profile signatures, such as similarly described herein. In addition, by capturing such network traffic activity of a potential malware sample during runtime in a sandbox, whether the potential malware sample is a member of a known malware family can be determined using IPS profile signatures, such as similarly described herein. This approach can be used by a security cloud service, such as described herein, to use sandbox techniques for detecting malware using IPS based techniques without host instrumentation.

For example, captured network traffic activity information (e.g., in pcap form or another form) can be provided to an IPS engine, which can determine whether such network traffic activity is associated with malware (e.g., matches a known threat or malicious network behavior) based on IPS signatures used by the IPS engine. In some embodiments, the IPS engine is an IPS engine (e.g., or a subset thereof) such as that implemented on integrated security appliances that provide inline filtering and IPS functionality.

In some embodiments, IPS based malware analysis techniques are used in addition to or in combination with other dynamic analysis techniques and/or static analysis techniques to identify malware and determine whether such malware is a member of a known malware family, as similarly described herein with respect to various embodiments.

Figure 8:
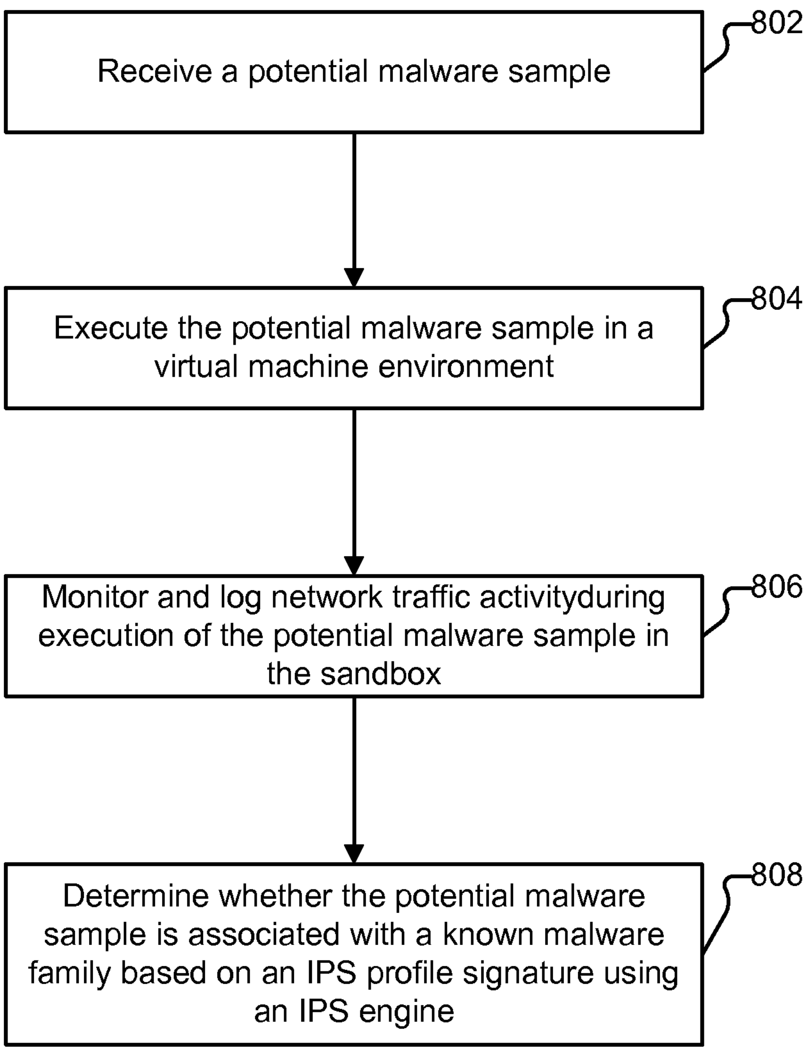
FIG. 8 is a flow diagram illustrating malware identification using IPS profile signatures in accordance with some embodiments.

FIG. 8 is a flow diagram illustrating malware identification using IPS profile signatures in accordance with some embodiments. At 802, a potential malware sample is received. At 804, the potential malware sample is executed in a VM environment (e.g., a sandbox). At 806, network traffic activity is monitored and logged during execution of the potential malware sample in the sandbox. At 808, whether the potential malware sample is associated with a known malware family based on an IPS profile signature using an IPS engine is determined.

Below are profile signature and IPS signature examples that can utilize the various techniques described herein to identify malware and determine whether the malware is associated with a known malware family based on runtime context information collected in a sandbox environment in accordance with various embodiments disclosed herein.

Profile Signature Example:

```
Mydoom.o example
<profile>
 <and>
     <match>
         <context>
             wf-api-log
         </context>
         <pattern>
             (CreateFileW,
             C:\\WINDOWS\\services.exe)
```

-continued

```
      </pattern>
    </match>
    <match>
      <context>
        wf-api-log
      </context>
      <pattern>
        (RegSetValueEx,
        \\REGISTRY\\MACHINE\\SOFT-
        WARE\\Microsoft\\Windows\\CurrentVersion\\Run, Services,
        C:\\WINDOWS\\services.exe)
      </pattern>
    </match>
  </and>
</profile>
```

SetFileAttributee, C: \Documents and Settings\Administrator\Local Settings\Temporary Internet Files api, 2476, SetFileAttributes, C: \Documents and Settings\Administrator\Local Settings\Temporary Internet Files SetFileAttributes, C: \Documents and Settings\Administrator\Local Settings\Temporary Internet Files\Content.IE5

RegCreateK.eyEx, HKEY CURRENT USER, Software\Microsoft\Windows\CurrentVersion\Explorer\User Shell Folders RegCreateKeyEx, HKEY CURRENT USER, Software\Microsoft\Windows\CurrentVersion\Explorer\Shell Folders RegCreateKeyEx, HKEY CURRENT USER, Software\Microsoft\Windows\CurrentVersion\Explorer\User Shell Folders RegCreateKeyEx, HKEY CURRENT USER, Software\Microsoft\Windows\CurrentVersion\Explorer\Shell Folders RegSetValueEx, \REGISTRY\USER\S-1-5-21-1004336348-362288127-725345543-500\Software\Microsoft\Windows\Current\Version\Explorer\Shell Folders, History, C: \Documents and Settings\Administrator\Local Settings\History SetFileAttributes, C: \Documents and Settings\Administrator\Local Settings\History SetFileAttributes, C: \Documents and Settings\Administrator\Local Settings\History file, 2468, CreateFileW, C: \WINDOWS\services.exe SetFileAttributes, C: \Document and Settings\Administrator\Cookies\CreateMutexW, Local\c: !documents and settings!administrator!local settings!history!history.ie5!

SetFileAttributes, C: \Documents and Settings\Administrator\Local Settings\History\History.IE5\

RegSetValueEx, \REGISTRY\MACHINE\SOFTWARE\Microsoft\Windows\CurrentVersion\Run, Services *C: \WINDOWS\services.exe LoadLibraryExW, ws2 32

CreateMutexW, Local\WininetConnectionMutex

LoadLibraryExW, wininet.dll

SleepEx, 1566804069

LoadLibraryExW, RASAPI32.dll

LoadLibraryExW, RTUTILS.DLL=0x76e80000, NULL, 0

RegCreateKeyEx, HKEY_LOCAL_MACHINE, Software\Microsoft\Tracing

LoadLibraryExW, SHELL32.dll

RegCreateKeyEx, HKEY LOCAL MACHINE, Software\Microsoft\Windows\CurrentVersion\Explorer\Shell Folders RegSetValueEx, \REGISTRY\MACHINE\SOFTWARE\Microsoft\Windows\CurrentVersion\Explorer\Shell Folders, Common AppData, C: \Documents and Settings\All Users\Application Data RegCreateKeyEx, \REGISTRY\USER\S-1-5-21-1004336348-362288127-725345543-500, Software\Microsoft\Windows\CurrentVersion\Explorer\User Shell Folders RegCreateKevEx, \REGISTRY\USER\S-1-5-21-1004336348-362288127-725345543-500, Software\Microsoft\Windows NT\CurrentVersion\Winlogon RegCreateKeyEx, \REGISTRY\USER\S-1-5-21-1004336348-362288127-725345543-500, Software\Microsoft\Windows\CurrentVersion\Explorer\Shell Folders RegSetValueEx, \REGISTRY\USER\S-1-5-21-004336348-362288127-725345543-500Software\Microsoft\Windows\CurrentVersion\Explorer\Shell Folders, AppData, C: \Documents and Settings\Administrator\Application Data LoadLibraryExW, sensapi.dll connect, 15.244.192.143:1034

RegSetValueEx, \REGISTRY\MACHINE\SOFTWARE\Microsoft\Windows\CurrentVersion\Run, Services, C: \WINDOWS\services.exe In this example, the profile signature looks for services.exe being created in the Windows folder and then being registered in the run key (e.g., applicable lines shown in bold). This is a known behavior of the mydoom family (i.e., mydoom.o to be exact). For purposes of illustration of this example and brevity, the API log size has been reduced.

The next is an example of a variant of the same malware family.

Mydoom.q Example

```
Mydoom.q example
<profile>
  <and>
    <match>
      <context>
        wf-api-log
      </context>
      <pattern>
        (CreateFileW,
        C:\\WINDOWS\\lsass\.exe)
      </pattern>
    </match>
    <match>
      <context>
        wf-api-log
      </context>
      <pattern>
        (RegSetValueEx,
\\REGISTRY\\MACHINE\\SOFT-
        WARE\Microsoft\\Windows\\CurrentVersion\\Run, Traybar,
        C:\\WINDOWS\\lsass\.exe)
      </pattern>
    </match>
  </and>
</profile>
```

SleepEx, 20000

LoadLibraryExW, KERNEL32.DLL

LoadLibraryExW, ADVAPI32.dll

LoadLibraryExW, MSVCRT.dll

LoadLibraryExW, USER32.dll

LoadLibraryExW, WS2 32.dll
RegCreateKeyEx, HKEY LOCAL MACHINE, Software\Microsoft\Windows\CurrentVersion\POSIX
RegCreateKeyEx, HKEY CURRENT USER, Software\Microsoft\Windows\CurrentVersion\POSIX
CreateFileW, C: \WINDOWS\lease.exe
registry, 2472, RegSetValueEx, \REGISTRY\MACHINE\SOFTWARE\Microsoft\Windows\CurrentVersion\Run, Traybar, C: \WINDOWS\lease.exe
RegCreateKeyEx, HKEY LOCAL MACHINE, System\CurrentControlSet\Services\Tcpip\Parameters
RegCreateKeyEx, HKEY LOCAL MACHINE, System\CurrentControlSet\Services\Tcpip\Parameters
RegCreateKeyEx, HKEY LOCAL MACHINE, System\CurrentControlSet\Services\Tcpip\Parameters
RegCreateKeyEx, HKEY LOCAL MACHINE, System\CurrentControlSet\Services\Tcpip\Parameters
LoadLibraryExW, rasadhlp.dll
CreateFileW, C: DOCUMENT~1\ADMINI~1\LOCALS~1\Temp\1ifsmh.txt, 2
LoadLibraryExW, C: \WINDOWS\System32\mswsock.dll
LoadLibraryExW, hnetcfg.dll
LoadLibraryExW, C: \WINDOWS\System32\mswsock.dll
LoadLibraryExW, C: \WINDOWS\System32\wshtcpip.dll
bind, 1042

The above sample is very similar to the mydoom.o example as an executable is created in the windows directory and then registered in run key (e.g., applicable lines shown in bold). However, after analysis it was discovered that the file names differ between the variants.

IPS Example

A Fosniw.gen command and control signature example is provided below.

```
<and>
<entry>
<pattern-match>
  <context>http-req-parrams</context:>
  <pattern>r autoidcnt\.asp\?mer seq=</pattern>
</pattern-match>
</entry>
</and>
```

Network traffic collected from the sample is provided below.

GET
iekeyword.com/app/
?prj=3&pid=jjh1&mac=002564335a16&logdata=MacTryCnt:0&code=default&ver=1.0.0.10 Mozilla/4.0 (compatible; MSIE 7.0; Windows NT 5.1; .NET CLR 2.0.50727)
GET
p.iekeyword.comhttp://p.iekeyword.com/receive/r auto idcnt.asp?mer seq=3&realid=jjh1&mac=002564335a16&logdata=MacTryCnt:0

Based on security analysis, it can be determined that fosniw samples use a pattern in the URI (r_autoidcnt.asp-?mer_seq=). As apparent from the above request, this will match and, thus, this signature verifies that this is malicious command and control (C&C) network traffic.

Also, these malware detection techniques illustrated by the above profile signature and IPS profile signature examples can occur without actually analyzing the samples themselves (e.g., static analysis is not required), rather these examples illustrate that such malware and malware family determinations can be performed by using the runtime monitoring and profile signature analysis techniques using a sandbox environment as described herein with respect to various embodiments. As will now be apparent, these and other malware and malware families can be determined using the runtime monitoring and profile signature analysis techniques using a sandbox environment as described herein with respect to various embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for malware family identification using profile signatures, comprising:
- a processor configured to:
  - receive, from a security device, a potential malware sample, wherein the security device is configured to, in the event an unknown file is encountered by the security device, send the unknown file to the processor as the potential malware sample;
  - execute the potential malware sample in a virtual machine environment, including by monitoring interaction during execution in the virtual machine environment between: (1) the potential malware sample and (2) an application programming interface (API) in order to obtain an API log which includes: (a) one or more files created by the potential malware sample using the API during execution in the virtual machine environment and (b) one or more files registered in a run key by the potential malware sample using the API during execution in the virtual machine environment; and
  - determine whether the potential malware sample is associated with a known malware family based on a profile signature, including by:
    - comparing (1a) the files created by the potential malware in the API log against (1b) one or more files created by the known malware family in the profile signature and (2a) the files registered in the run key in the API log against (2b) one or more files registered in the run key by the known malware family in the profile signature; and
    - in the event (1a) matches (1b) and (2a) matches (2b), identifying the potential malware sample as being a member of the known malware family; and
- a memory coupled to the processor and configured to provide the processor with instructions.

2. The system recited in claim 1, wherein the virtual machine environment includes an instrumented virtual machine environment for monitoring potential malware samples during execution.

3. The system recited in claim 1, wherein the processor is configured to determine whether the potential malware sample is associated with the known malware family, further including by:
- performing a static analysis of the potential malware sample.

4. The system recited in claim 1, wherein the profile signature includes an intrusion prevention system (IPS) signature.

5. The system recited in claim 1, wherein the processor is configured to determine whether the potential malware sample is associated with the known malware family, further including by:
- monitoring network activities performed by the potential malware sample during execution time in the virtual machine environment.

6. The system recited in claim 1, wherein the profile signature includes an intrusion prevention system (IPS) signature, and wherein the processor is configured to determine whether the potential malware sample is associated with the known malware family, further including by:

monitoring network activities performed by the potential malware sample during execution time in the virtual machine environment.

7. A method of malware family identification using profile signatures, comprising:

receiving, from a security device, a potential malware sample, wherein the security device is configured to, in the event an unknown file is encountered by the security device, send the unknown file to a processor as the potential malware sample;

using the processor to execute a potential malware sample in a virtual machine environment, including by monitoring interaction during execution in the virtual machine environment between: (1) the potential malware sample and (2) an application programming interface (API) in order to obtain an API log which includes: (a) one or more files created by the potential malware sample using the API during execution in the virtual machine environment and (b) one or more files registered in a run key by the potential malware sample using the API during execution in the virtual machine environment; and determining whether the potential malware sample is associated with a known malware family based on a profile signature, including by:

comparing (1a) the files created by the potential malware in the API log against (1b) one or more files created by the known malware family in the profile signature and (2a) the files registered in the run key in the API log against (2b) one or more files registered in the run key by the known malware family in the profile signature; and in the event (1a) matches (1b) and (2a) matches (2b), identifying the potential malware sample as being a member of the known malware family.

8. The method of claim 7, wherein the virtual machine environment includes an instrumented virtual machine environment for monitoring potential malware samples during execution.

9. The method of claim 7, wherein determining whether the potential malware sample is associated with the known malware family further includes:

monitoring network activities performed by the potential malware sample during execution time in the virtual machine environment.

10. The method of claim 7, wherein the profile signature includes an intrusion prevention system (IPS) signature, and determining whether the potential malware sample is associated with the known malware family further includes:

monitoring network activities performed by the potential malware sample during execution time in the virtual machine environment.

11. A computer program product for malware family identification using profile signatures, the computer program product being embodied in a non-transitory computer readable storage medium and comprising computer instructions for:

receiving, from a security device, a potential malware sample, wherein the security device is configured to, in the event an unknown file is encountered by the security device, send the unknown file as the potential malware sample;

executing a potential malware sample in a virtual machine environment, including by monitoring interaction during execution in the virtual machine environment between: (1) the potential malware sample and (2) an application programming interface (API) in order to obtain an API log which includes: (a) one or more files created by the potential malware sample using the API during execution in the virtual machine environment and (b) one or more files registered in a run key by the potential malware sample using the API during execution in the virtual machine environment; and determining whether the potential malware sample is associated with a known malware family based on a profile signature, including by:

comparing (1a) the files created by the potential malware in the API log against (1b) one or more files created by the known malware family in the profile signature and (2a) the files registered in the run key in the API log against (2b) one or more files registered in the run key by the known malware family in the profile signature; and in the event (1a) matches (1b) and (2a) matches (2b), identifying the potential malware sample as being a member of the known malware family.

12. The computer program product recited in claim 11, wherein the virtual machine environment includes an instrumented virtual machine environment for monitoring potential malware samples during execution.

13. The computer program product recited in claim 11, wherein the computer instructions for determining whether the potential malware sample is associated with the known malware family further include computer instructions for:

monitoring network activities performed by the potential malware sample during execution time in the virtual machine environment.

14. The computer program product recited in claim 11, wherein the profile signature includes an intrusion prevention system (IPS) signature, and the computer instructions for determining whether the potential malware sample is associated with the known malware family further include computer instructions for:

monitoring network activities performed by the potential malware sample during execution time in the virtual machine environment.

15. The system recited in claim 1, wherein the security device includes one or more of the following: a gateway based firewall, an appliance based firewall, or a server based firewall.

16. The method recited in claim 7, wherein the security device includes one or more of the following: a gateway based firewall, an appliance based firewall, or a server based firewall.

17. The computer program product recited in claim 11, wherein the security device includes one or more of the following: a gateway based firewall, an appliance based firewall, or a server based firewall.

18. The method of claim 7, wherein determining whether the potential malware sample is associated with the known malware family further includes:

performing a static analysis of the potential malware sample.

19. The computer program product recited in claim 11, wherein the computer instructions for determining whether the potential malware sample is associated with the known malware family further include computer instructions for:

performing a static analysis of the potential malware sample.

* * * * *